(12) United States Patent
Mathew et al.

(10) Patent No.: US 8,880,800 B2
(45) Date of Patent: Nov. 4, 2014

(54) REDUNDANT ARRAY OF INDEPENDENT DISKS SYSTEM WITH INTER-CONTROLLER COMMUNICATION AND METHOD OF OPERATION THEREOF

(75) Inventors: Manoj Mathew, Sunnyvale, CA (US); Mohan B. Rowlands, Union City, CA (US)

(73) Assignee: Promise Technology, Inc., Milpitas, CA (US)

( * ) Notice: Subject to any disclaimer, the term of this patent is extended or adjusted under 35 U.S.C. 154(b) by 186 days.

(21) Appl. No.: 13/112,983

(22) Filed: May 20, 2011

(65) Prior Publication Data

US 2012/0297135 A1  Nov. 22, 2012

(51) Int. Cl.
*G06F 12/00* (2006.01)
*G06F 15/163* (2006.01)
*G06F 11/10* (2006.01)

(52) U.S. Cl.
CPC .......... *G06F 11/1076* (2013.01); *G06F 15/163* (2013.01)

USPC ............ 711/114; 711/111; 711/162; 710/313

(58) Field of Classification Search
USPC .......................................... 711/114, E12.001
See application file for complete search history.

(56) References Cited

U.S. PATENT DOCUMENTS

| 6,446,175 B1 * | 9/2002 | West et al. ..................... 711/162 |
| 7,315,911 B2 * | 1/2008 | Davies et al. .................. 710/260 |
| 7,536,495 B2 * | 5/2009 | Ashmore et al. .............. 710/313 |

\* cited by examiner

*Primary Examiner* — Reginald Bragdon
*Assistant Examiner* — Hannah A Faye-Joyner
(74) *Attorney, Agent, or Firm* — Ishimaru & Associates LLP

(57) ABSTRACT

A method of operation of a redundant array of independent disks system includes: instantiating a first controller having a first local map and a first remote map; instantiating a second controller having a second local map and a second remote map mapped to the first local map; mapping a first memory device to the first local map by the first controller; coupling a storage device to the second controller and the first controller; and switching control of the storage device to the first controller, when a failure of the second controller is detected, by the first controller reading the first memory device.

20 Claims, 4 Drawing Sheets

REDUNDANT ARRAY OF INDEPENDENT DISKS SYSTEM WITH INTER-CONTROLLER COMMUNICATION AND METHOD OF OPERATION THEREOF

CROSS REFERENCE TO RELATED APPLICATION(S)

The present application contains subject matter related to concurrently filed U.S. patent application Ser. No. 13/112,988. The related application is assigned to Promise Technology, Inc. and the subject matter thereof is incorporated herein by reference thereto.

TECHNICAL FIELD

The present invention relates generally to a redundant array of independent disks system, and more particularly to a system for inter-controller communication.

BACKGROUND ART

In every industry, computers are coming into everyday use. These computers are used to write and read data to large storage devices to store and recall the tremendous volumes of information that are increasingly required by small and large businesses.

Storage devices in all computer systems are susceptible to failures. This is especially true in disk drives where failures can be caused by temperature variations, head crashes, motor failure, controller failure, and changing voltage conditions. Modern computer systems for critical systems, such as airport controllers, require a fault-tolerant data storage system, for protecting data against disk drive failure.

One approach to meeting this need is to provide a redundant array of independent disks (RAID) system operated by a disk array controller (controller). RAID technology developed to provide for reliable storage of data on multiple storage devices. RAID allows the combining of two or more storage devices, such as disk drive systems, to create an array of storage devices.

Hardware or software implementation allows the multiple storage devices to be treated as one logical storage device. Data is stored redundantly in various ways to enhance data integrity and availability. RAID sub-systems provide cost-effective solutions for storage strategies. RAID systems are also able to provide improved data transfer rates and throughput of data.

Redundant array of independent disks (RAID) technology provides various ways to use multiple storage devices to increase availability and performance. A number of RAID levels have been defined in which each level provides unique throughput and fault tolerance characteristics. Several RAID levels provide fault tolerance such that if one of the multiple storage devices fails, then access to all data stored on the array is still available. The failed storage device may be replaced or repaired while the array is still usable and accessible as though there had been no failure.

Thus, a need still remains for a redundant array of independent disks system with inter-controller communication to provide a fault-tolerant data storage system. In view of data reliability, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a redundant array of independent disks system including: instantiating a first controller having a first local map and a first remote map; instantiating a second controller having a second local map and a second remote map mapped to the first local map; mapping a first memory device to the first local map by the first controller; coupling a storage device to the second controller and the first controller; and switching control of the storage device to the first controller, when a failure of the second controller is detected, by the first controller reading the first memory device.

The present invention provides a redundant array of independent disks system, including: a first controller having a first local map and a first remote map; a second controller having a second local map and a second remote map mapped to the first local map; a first memory device mapped to the first local map by the first controller; and a storage device coupled to the second controller and the first controller, the storage device controlled by the second controller with control of the storage device switched to the first controller, when a failure of the second controller is detected, by the first controller reading the first memory device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
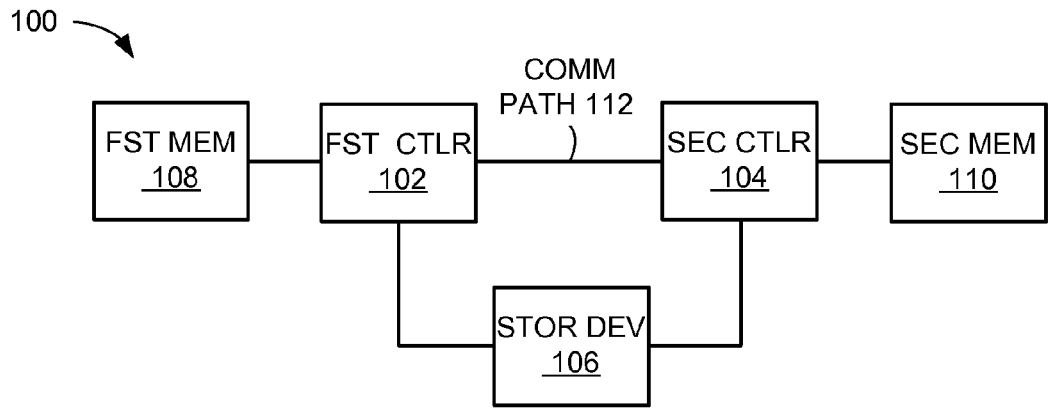
FIG. 1 is a functional block diagram of a redundant array of independent disks system in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

RAID technology provides availability of data in case of storage device failure. However, this does not protect against problems of failure of the RAID controller. To protect from RAID controller failure, advance sub-systems design includes fully redundant active/active hot-swappable controllers and load balanced power and cooling units. The active/active RAID controllers balance the workload across the data paths in normal operation and provide redundant data paths and high availability in the unlikely event of a controller failure. An inter-controller communication between controllers is used to checkpoint software and hardware states between controllers so that when a controller fails, the other controller can seamlessly take over the operation of the failed controller. Embodiments of the present invention provide answers or solutions to the problems.

Referring now to FIG. 1, therein is shown a functional block diagram of a redundant array of independent disks system 100 in an embodiment of the present invention. The redundant array of independent disks system 100 can include multiple controllers.

The redundant array of independent disks system 100 can include high-speed symmetric inter-controller communication protocol using direct remote writes and writes only scheme. The symmetric nature of the inter-controller communication protocol requires more than one controller. The inter-controller communication protocol uses the remote writes to overcome the inherent performance slowness in using reads in Peripheral Component Interconnect Express (PCIe) bus. The inter-controller communication protocol uses no intermediate buffer but direct (remote) writes into a remote controller.

The redundant array of independent disks system 100 can include a first controller 102 and a second controller 104. The first controller 102 and the second controller 104 are devices that access, manage, or control storage devices 106 that are used for storing information or data. The storage devices 106 can be coupled to the first controller 102 and the second controller 104.

The second controller 104 can be connected to or with the first controller 102. The first controller 102 and the second controller 104 are provided by instantiating or connecting instances of devices, that can be either the same or different from each other, in the redundant array of independent disks system 100.

For example, the first controller 102 and the second controller 104 can function as redundant array of independent disks (RAID) controllers. Also for example, the storage devices 106 can include an array of disk drives or just a bunch of drives (JBODs).

The first controller 102 and the second controller 104 can be connected to a first memory device 108 and a second memory device 110, respectively, which provide storage for storing temporary data to manage or control the storage devices 106. The first controller 102 and the second controller 104 can communicate to each other via a communication path 112, which is an electrical interface including, for example, a Peripheral Component Interconnect Express (PCIe-TM) or any other communication protocol. The communication path 112 can include a switching mechanism including a non-transparent bridge or any other forwarding technique.

The first controller 102 can communicate with the second controller 104 to access, send, or write information to the second memory device 110. The second controller 104 can communicate with the first controller 102 to access, send, or write information to the first memory device 108.

Either one or both of the first controller 102 and the second controller 104 can function as active controllers. For example, when the first controller 102 in an active-active controller pair fails, an operating system can have a capability to manually assign the second controller 104 an ability to manage or control the storage devices 106 in a failover scenario.

In a redundant RAID subsystem, controller states and data need to be synchronized across controllers so that the surviving or redundant controller can take over the function of the failed controller without any interruptions. This requires a high speed and robust communication between controllers.

In this invention, the first controller 102 and the second controller 104 can be interconnected by the communication path 112 including a high-speed PCIe interface through a PCIe non-transparent bridge. Portions of or the entire memory of a remote controller, such as the second controller 104 or the first controller 102, can be mapped on a local controller, such as the first controller 102 or the second controller 104, respectively. This helps the local controller performs a direct write, read, or execute of the remote memory thereby avoiding an intermediate buffer while doing write or read command execution.

A read and write type command interface can be provided as a controller-to-controller (C2C) communication protocol. This C2C communication protocol can be built over infrastructures of queues and indices. As PCIe read transactions are slow compared to PCIe writes, all transactions used for the queues, the indices, as well as the C2C communication protocol can be designed such that PCIe reads are entirely avoided and only PCIe writes are used.

For illustration purposes, the redundant array of independent disks system 100 is shown with two controllers, although it is understood that the redundant array of independent disks system 100 can include two or more controllers.

It has been discovered that the first controller 102 and the second controller 104 automatically switch or take over the management or control of the storage devices 106 upon detecting a failure of the other controller with the high-speed symmetric inter-controller communication protocol. Such automation allows less command drops and shorter delays, thereby providing continuous availability and high reliability.

Figure 2:
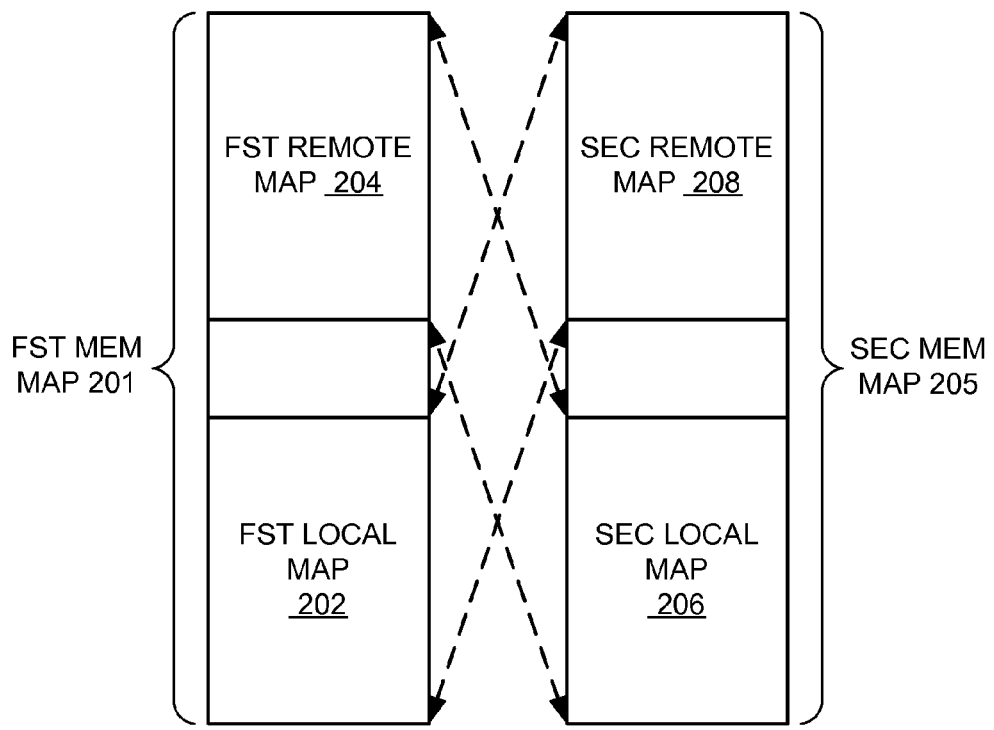
FIG. 2 is a controller memory map of the first controller and the second controller.

Referring now to FIG. 2, therein is shown a controller memory map of the first controller 102 and the second controller 104. The controller memory map can include a first memory map 201 having a first local map 202 and a first remote map 204. The controller memory map can include a second memory map 205 having a second local map 206 and a second remote map 208. The first memory map 201 and the second memory map 205 are diagrams or charts that show how memories are accessed in the first controller 102 and the second controller 104, respectively.

The first memory map 201 can include not only a memory map of the first memory device 108 of FIG. 1 of the first controller 102 of FIG. 1 but also memory maps of other memory devices, one of which is shown as the first remote map 204. The second memory map 205 can include not only a memory map of the second memory device 110 of FIG. 1 of the second controller 104 of FIG. 1 but also memory maps of other memory devices, one of which is shown as the second remote map 208.

The first local map 202 and the second local map 206 are portions of the first memory map 201 and the second memory map 205, respectively, that are mapped to the first memory device 108 and the second memory device 110, respectively. The first controller 102 and the second controller 104 can locally access the first memory device 108 and the second memory device 110 by accessing the first local map 202 and the second local map 206, respectively.

The first remote map 204 and the second remote map 208 are portions of the first memory map 201 and the second memory map 205 that are mapped to the second local map 206 and the first local map 202, respectively. The second local map 206 and the first local map 202 can be accessed or updated by the first controller 102 and the second controller 104 via the first remote map 204 and the second remote map 208, respectively, so that direct writes, reads, and execution can be possible.

The first local map 202 and the second local map 206 are local maps since they are mapped to the first memory device 108 and the second memory device 110, respectively, that are local to the first controller 102 and the second controller 104, respectively. The first remote map 204 and the second remote map 208 are remote maps since they are mapped to the second memory device 110 and the first memory device 108, respectively, that are remote to the first controller 102 and the second controller 104, respectively.

The first controller 102 and the second controller 104 can write and read any memory location in the first memory map 201 and the second memory map 205, respectively. For example, the first controller 102 and the second controller 104 can perform direct remote writes or send write transactions over the communication path 112 of FIG. 1 to update memory locations in the second local map 206 and the first local map 202 by writing to the first remote map 204 and the second remote map 208, respectively.

In an event when the first controller 102 or the second controller 104 fails, the second controller 104 or the first controller 102, respectively, switches or takes over control of the storage devices 106 of FIG. 1. The control switching can be done by the second controller 104 or the first controller 102 reading an entirety of the second memory device 110 or the first memory device 108, respectively.

The first local map 202 and the second local map 206 include information for the first controller 102 and the second controller 104, respectively, to manage or control the storage devices 106. The first remote map 204 and the second remote map 208 can be written by the first controller 102 and the second controller 104 to update the second local map 206 and the first local map 202, respectively.

When the first controller 102 and the second controller 104 write to or access the first remote map 204 and the second remote map 208, the communication path 112 can redirect the memory access to the second local map 206 and the first local map 202, respectively. These two schemes in the model help to achieve a high-speed communication interface across controllers and avoid intermediate buffers.

For illustration purposes, the first memory map 201 and the second memory map 205 are shown with each having two memory maps, although it is understood that each of the first memory map 201 and the second memory map 205 can include two or more memory maps in a system with two or more controllers. Each of the memory maps can be mapped to a memory device of each of the controllers.

It has been discovered that the first remote map 204 and the second remote map 208 directly read and written by the first controller 102 and the second controller 104, respectively, provide a mechanism with the inter-controller communication protocol by avoiding expensive PCIe reads with direct writes into the remote memory without any intermediate buffer resulting in high or improved bandwidth and low or improved latency communication. The complete communication protocol is used to synchronize checkpoint and data across controllers. This is important because the first controller 102 and the second controller 104 have all the information to take over the workload from the second controller 104 and the first controller 102, respectively.

Figure 3:
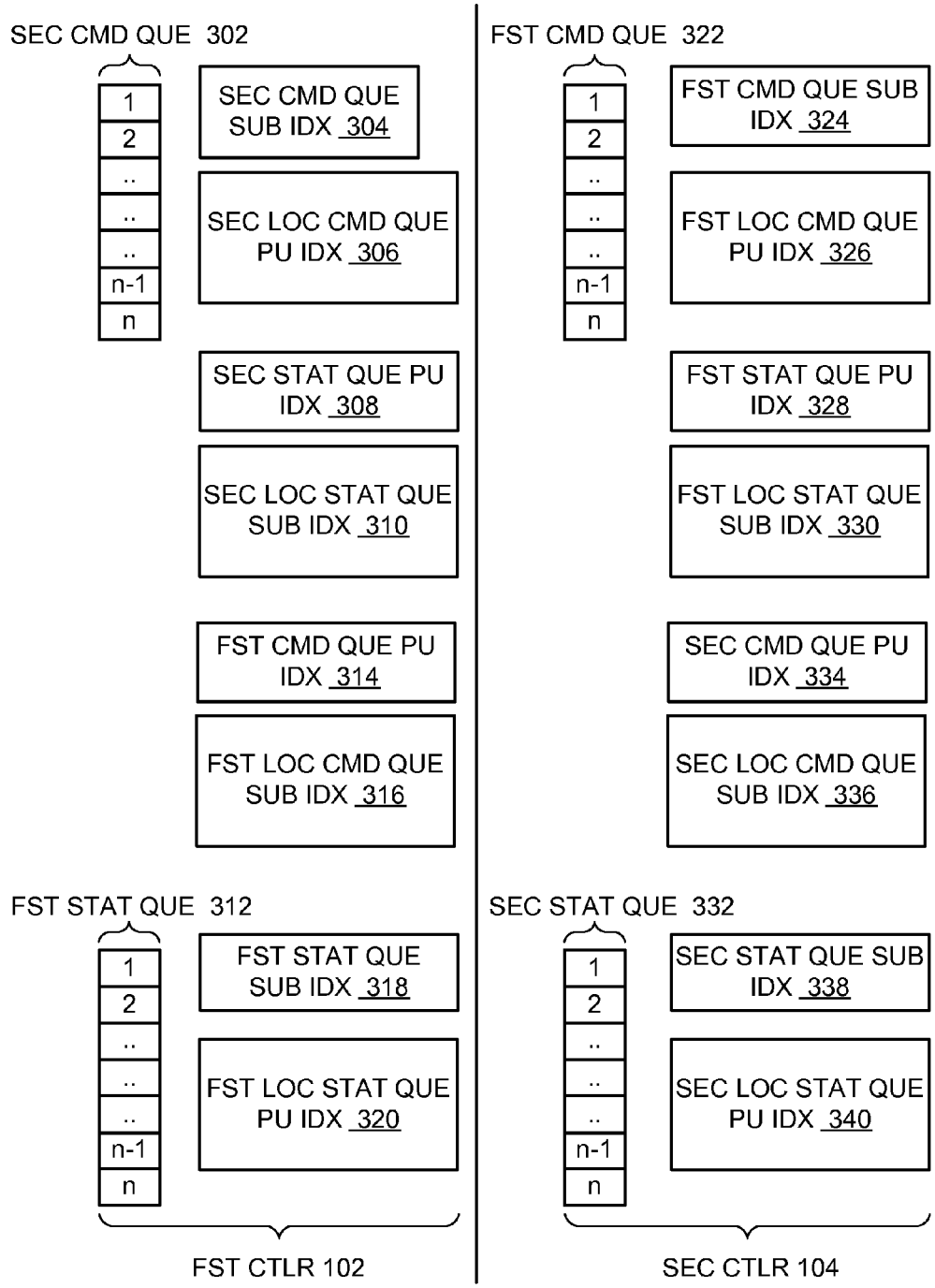
FIG. 3 is a functional block diagram of controller queues and indices.

Referring now to FIG. 3, therein is shown a functional block diagram of controller queues and indices. The first memory device 108 of FIG. 1 can include the same set of the controller queues and indices as those in the second memory device 110 of FIG. 1. The same set of the controller queues and indices help achieve a symmetric architecture on the first controller 102 and the second controller 104. Functionality or purpose of the controller queues and indices will be subsequently described in more details. In the following description, subscripts 1 and 2 refer to queues or indices that are used by the first controller 102 and the second controller 104, respectively.

The first memory device 108 can be used to store a second command queue 302 ($CQ_2$), a second command queue submit index 304 ($CQSI_2$), a second local command queue pickup index 306 ($LCCQPI_2$), a second status queue pickup index 308 ($SQPI_2$), and a second local status queue submit index 310 ($LCSQSI_2$). The first memory device 108 can be used to store a first status queue 312 ($SQ_1$), a first command queue pickup index 314 ($CQPI_1$), a first local command queue submit index 316 ($LCCQSI_1$), a first status queue submit index 318 ($SQSI_1$), and a first local status queue pickup index 320 ($LCSQPI_1$).

The second memory device 110 can be used to store a first command queue 322 ($CQ_1$), a first command queue submit index 324 ($CQSI_1$), a first local command queue pickup index 326 ($LCCQPI_1$), a first status queue pickup index 328 ($SQPI_1$), and a first local status queue submit index 330 ($LCSQSI_1$). The second memory device 110 can be used to store a second status queue 332 ($SQ_2$), a second command queue pickup index 334 ($CQPI_2$), a second local command queue submit index 336 ($LCCQSI_2$), a second status queue submit index 338 ($SQSI_2$), and a second local status queue pickup index 340 ($LCSQPI_2$).

The second local command queue pickup index 306 ($LCCQPI_2$) is a local copy of the second command queue pickup index 334 ($CQPI_2$). The second local status queue submit index 310 ($LCSQSI_2$) is a local copy of the second status queue submit index 338 ($SQSI_2$). The first local command queue submit index 316 ($LCCQSI_1$) is a local copy of the first command queue submit index 324 ($CQSI_1$). The first local status queue pickup index 320 ($LCSQPI_1$) is a local copy of the first status queue pickup index 328 ($SQPI_1$).

The first local command queue pickup index 326 (LCCQPI$_1$) is a local copy of the first command queue pickup index 314 (CQPI$_1$). The first local status queue submit index 330 (LCSQSI$_1$) is a local copy of the first status queue submit index 318 (SQSI$_1$). The second local command queue submit index 336 (LCCQSI$_2$) is a local copy of the second command queue submit index 304 (CQSI$_2$). The second local status queue pickup index 340 (LCSQPI$_2$) is a local copy of the second status queue pickup index 308 (SQPI$_2$).

The second command queue 302 (CQ$_2$) and the first command queue 322 (CQ$_1$) can be remotely written or updated by the second controller 104 and the first controller 102, respectively. The second command queue 302 (CQ$_2$) and the first command queue 322 (CQ$_1$) reside in the first memory device 108 and the second memory device 110 so that the first controller 102 and the second controller 104, respectively, can read and process commands from the other controller.

Each of the first local map 202 of FIG. 2 and the second local map 206 of FIG. 2 can include reserved space for queues and indices of the other controller. Each of the first local map 202 and the second local map 206 can also include additional space for its own queues and indices to process.

It has been discovered that the first memory device 108 having the second command queue 302 (CQ$_2$), the second command queue submit index 304 (CQSI$_2$), the second local command queue pickup index 306 (LCCQPI$_2$), the second status queue pickup index 308 (SQPI$_2$), and the second local status queue submit index 310 (LCSQSI$_2$) and that the second memory device 110, with the same set of the controller queues and indices, having the first command queue 322 (CQ$_1$), the first command queue submit index 324 (CQSI$_1$), the first local command queue pickup index 326 (LCCQPI$_1$), the first status queue pickup index 328 (SQPI$_1$), and the first local status queue submit index 330 (LCSQSI$_1$) provide symmetric inter-controller communication architecture on the first controller 102 and the second controller 104 using direct remote writes and write only scheme resulting in improved reliability and availability.

It has also been discovered that the first memory device 108 having the first status queue 312 (SQ$_1$), the first command queue pickup index 314 (CQPI$_1$), the first local command queue submit index 316 (LCCQSI$_1$), the first status queue submit index 318 (SQSI$_1$), and the first local status queue pickup index 320 (LCSQPI$_1$) and that the second memory device 110, with the same set of the controller queues and indices, having the second status queue 332 (SQ$_2$), the second command queue pickup index 334 (CQPI$_2$), the second local command queue submit index 336 (LCCQSI$_2$), the second status queue submit index 338 (SQSI$_2$), and the second local status queue pickup index 340 (LCSQPI$_2$) provide symmetric inter-controller communication architecture on the first controller 102 and the second controller 104 using direct remote writes and write only scheme resulting in improved reliability and availability.

Figure 4:
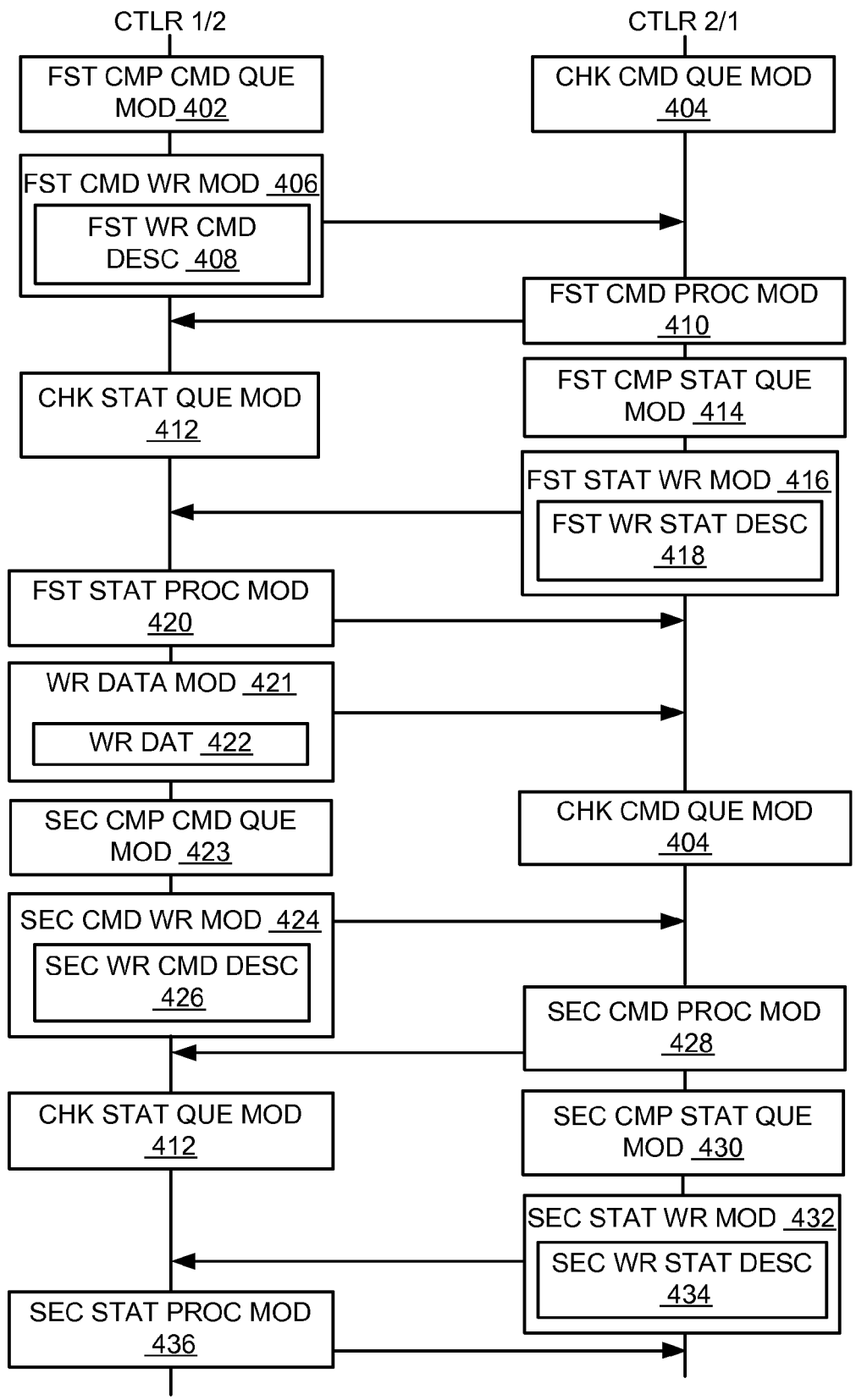
FIG. 4 is a write command functional flow.

Referring now to FIG. 4, therein is shown a write command functional flow. The write command functional flow depicts a write command flow between the first controller 102 of FIG. 1 and the second controller 104 of FIG. 1. The first controller 102 can initiate and perform a write transaction from the first controller 102 to the second controller 104.

The first controller 102 can include a first compare command queue module 402 to compare the first local command queue submit index 316 (LCCQSI$_1$) of FIG. 3 plus one and the first command queue pickup index 314 (CQPI$_1$) of FIG. 3. If the comparison result is the same, the first command queue 322 (CQ$_1$) of FIG. 3 is full and to be retried. Otherwise, a command descriptor can be submitted from the first controller 102 to a remote controller, such as the second controller 104.

The second controller 104 can include a check command queue module 404 to compare the first command queue submit index 324 (CQSI$_1$) of FIG. 3 and the first local command queue pickup index 326 (LCCQPI$_1$) of FIG. 3. If the comparison result is different, there is a command descriptor submitted by a remote controller, such as the first controller 102, to the second controller 104 for processing. The check command queue module 404 can run or operate in a loop to pick or select any new command descriptor submitted by the remote controller.

The first controller 102 can include a first command write module 406 to generate, and place, store, or update a first write command descriptor 408 in a remote command queue, such as the first command queue 322 (CQ$_1$), by writing to a remote memory mapped locally, such as the first remote map 204 of FIG. 2. The first write command descriptor 408 can include a command and an intended size of data to be written. A write transaction with information for the first write command descriptor 408 can be transmitted from the first controller 102 to the second controller 104 over the communication path 112 of FIG. 1.

The first command write module 406 updates the first command queue submit index 324 (CQSI$_1$) by writing to a remote memory mapped locally, such as the first remote map 204. The first command write module 406 also updates the first local command queue submit index 316 (LCCQSI$_1$). A write transaction with information for the first command queue submit index 324 (CQSI$_1$) can be transmitted from the first controller 102 to the second controller 104 over the communication path 112.

The second controller 104 can include a first command process module 410 to pick up or read a new command descriptor from the first command queue 322 (CQ$_1$) for processing after the first write command descriptor 408 and the first command queue submit index 324 (CQSI$_1$) are received from the first controller 102. The first command process module 410 is executed when the check command queue module 404 detects a new command descriptor, such as the first write command descriptor 408, is submitted.

The first command process module 410 updates the first command queue pickup index 314 (CQPI$_1$) by writing to a remote memory mapped locally, such as the second remote map 208. A write transaction with information for the first command queue pickup index 314 (CQPI$_1$) can be transmitted from the second controller 104 to the first controller 102 over the communication path 112.

The first command process module 410 also updates the first local command queue pickup index 326 (LCCQPI$_1$). A command in the first write command descriptor 408 is then processed and a data buffer is allocated by the first command process module 410.

The first controller 102 can include a check status queue module 412 to compare the first status queue submit index 318 (SQSI$_1$) of FIG. 3 and the first local status queue pickup index 320 (LCSQPI$_1$) of FIG. 3. If the comparison result is different, there is a status descriptor submitted by a remote controller, such as the second controller 104, to the first controller 102 for processing. This module can run or operate in a loop to pick or select any new status descriptor submitted by the remote controller.

The second controller 104 can include a first compare status queue module 414 to compare the first local status queue submit index 330 (LCSQSI$_1$) of FIG. 3 plus one and the first status queue pickup index 328 (SQPI$_1$) of FIG. 3. If the comparison result is the same, the first status queue 312 ($SQ_1$) of FIG. 3 is full and to be retried. Otherwise, a status descriptor can be submitted from the second controller 104 to a remote controller, such as the first controller 102.

The second controller 104 can include a first status write module 416 to generate, and place or store a first write status descriptor 418 in a remote status queue, such as the first status queue 312 ($SQ_1$), by writing to a remote memory mapped locally, such as the second remote map 208 of FIG. 2. The first write status descriptor 418 can include a memory location of the data buffer where the data is to be placed or stored. A write transaction with information for the first write status descriptor 418 can be sent or transmitted from the second controller 104 to the first controller 102 over the communication path 112.

The first status write module 416 updates the first status queue submit index 318 ($SQSI_1$) by writing to a remote memory mapped locally, such as the second remote map 208. The first status write module 416 also updates the first local status queue submit index 330 ($LCSQSI_1$). A write transaction with information for the first status queue submit index 318 ($SQSI_1$) can be sent or transmitted from the second controller 104 to the first controller 102 over the communication path 112.

The first controller 102 can include a first status process module 420 to pick up or read a new status descriptor from the first status queue 312 ($SQ_1$) for processing after the first write status descriptor 418 and the first status queue submit index 318 ($SQSI_1$) are received from the second controller 104. The first status process module 420 is executed when the check status queue module 412 detects a new status descriptor, such as the first write status descriptor 418, is submitted.

The first status process module 420 updates the first status queue pickup index 328 ($SQPI_1$) by writing to a remote memory mapped locally, such as the first remote map 204. A write transaction with information for the first status queue pickup index 328 ($SQPI_1$) can be transmitted from the first controller 102 to the second controller 104 over the communication path 112.

The first status process module 420 also updates the first local status queue pickup index 320 ($LCSQPI_1$). The first write status descriptor 418 is then processed by the first status process module 420.

The first controller 102 can include a write data module 421 to generate, and place or store write data 422 directly into a requested remote's memory location by writing to a remote memory mapped locally, such as the first remote map 204. A write transaction with information for the write data 422 of the data can be sent or transmitted from the first controller 102 to the second controller 104 over the communication path 112.

The second controller 104 can include the check command queue module 404, as described above, to compare the first command queue submit index 324 ($CQSI_3$) and the first local command queue pickup index 326 ($LCCQPI_1$). If the comparison result is different, there is a command descriptor submitted by a remote controller, such as the first controller 102, to the second controller 104 for processing.

As described above, the check command queue module 404 can run or operate in a loop to pick any new command descriptor submitted by the remote controller. The check command queue module 404 is described and included again here for clarity purposes.

The first controller 102 can include a second compare command queue module 423 to compare the first local command queue submit index 316 ($LCCSQI_1$) plus one and the first command queue pickup index 314 ($CQPI_1$). If the comparison result is the same, the first command queue 322 ($CQ_1$) is full and to be retried. Otherwise, a command descriptor can be submitted from the first controller 102 to a remote controller, such as the second controller 104. The second compare command queue module 423 can be similar or the same as the first compare command queue module 402. The second compare command queue module 423 needs to be executed as part of the logic flow and hence mentioned here.

The first controller 102 can include a second command write module 424 to generate, and place or store a second write command descriptor 426 in a remote command queue, such as the first command queue 322 ($CQ_1$), by writing to a remote memory mapped locally, such as the first remote map 204. A write transaction with information for the second write command descriptor 426 can be sent or transmitted from the first controller 102 to the second controller 104 over the communication path 112.

The second command write module 424 updates the first command queue submit index 324 ($CQSI_1$) by writing to a remote memory mapped locally, such as the first remote map 204. The second command write module 424 also updates the first local command queue submit index 316 ($LCCQSI_1$). A write transaction with information for the first command queue submit index 324 ($CQSI_1$) can be sent or transmitted from the first controller 102 to the second controller 104 over the communication path 112.

The second controller 104 can include a second command process module 428 to pick up or read a new command descriptor from the first command queue 322 ($CQ_1$) for processing after the second write command descriptor 426 and the first command queue submit index 324 ($CQSI_1$) are received from the first controller 102. The second command process module 428 is executed when the check command queue module 404 detects a new command descriptor, such as the second write command descriptor 426, is submitted.

The second command process module 428 updates the first command queue pickup index 314 ($CQPI_1$) by writing to a remote memory mapped locally, such as the second remote map 208. A write transaction with information for the first command queue pickup index 314 ($CQPI_1$) can be sent or transmitted from the second controller 104 to the first controller 102 over the communication path 112.

The second command process module 428 also updates the first local command queue pickup index 326 ($LCCQPI_1$). The command in the descriptor, such as the second write command descriptor 426, and the data, such as the write data 422, are then processed by the second command process module 428.

The first controller 102 can include the check status queue module 412, as described above, to compare the first status queue submit index 318 ($SQSI_1$) and the first local status queue pickup index 320 ($LCSQPI_1$). If the comparison result is different, there is a status descriptor submitted by a remote controller, such as the second controller 104, to the first controller 102 for processing.

As described above, the check status queue module 412 can run or operate in a loop to pick any new status descriptor submitted by the remote controller. The check status queue module 412 is described and included again here for clarity purposes.

The second controller 104 can include a second compare status queue module 430 to compare the first local status queue submit index 330 ($LCSQSI_1$) plus one and the first status queue pickup index 328 ($SQPI_1$). If the comparison result is the same, the first status queue 312 ($SQ_1$) is full and to be retried. Otherwise, a status descriptor can be submitted from the second controller 104 to a remote controller, such as the first controller 102.

The second controller 104 can include a second status write module 432 to generate, and place or store a second write status descriptor 434 in a remote status queue, such as the first status queue 312 ($SQ_1$), by writing to a remote memory mapped locally, such as the second remote map 208. The second write status descriptor 434 can include the status of the command. A write transaction with information for the second write status descriptor 434 can be sent or transmitted from the second controller 104 to the first controller 102 over the communication path 112.

The second status write module 432 updates the first status queue submit index 318 ($SQSI_1$) by writing to a remote memory mapped locally, such as the second remote map 208. The second status write module 432 also updates the first local status queue submit index 330 ($LCSQSI_1$). A write transaction with information for the first status queue submit index 318 ($SQSI_1$) can be sent or transmitted from the second controller 104 to the first controller 102 over the communication path 112.

The first controller 102 can include a second status process module 436 to pick up or read a new status descriptor, such as the second write status descriptor 434, from the first status queue 312 ($SQ_1$) for processing after the second write status descriptor 434 and the first status queue submit index 318 ($SQSI_1$) are received from the second controller 104. The second status process module 436 is executed when the check status queue module 412 detects a new status descriptor, such as the second write status descriptor 434, is submitted.

The second status process module 436 updates the first status queue pickup index 328 ($SQPI_1$) by writing to a remote memory mapped locally, such as the first remote map 204. A write transaction with information for the first status queue pickup index 328 ($SQPI_1$) can be transmitted from the first controller 102 to the second controller 104 over the communication path 112.

The second status process module 436 also updates the first local status queue pickup index 320 ($LCSQPI_1$). The status in the descriptor, such as the second write status descriptor 434, is then processed by the second status process module 436. This completes the write command functional flow.

For illustrative purposes, the first controller 102 and the second controller 104 are depicted having modules described above, although it is understood that each of the first controller 102 and the second controller 104 can include the same modules. For example, each of the first controller 102 and the second controller 104 can include all of the previously described modules in both of the first controller 102 and the second controller 104.

It has been discovered that a write transaction with information for the first command queue submit index 324, the first status queue pickup index 328, the first write command descriptor 408 to be written to the first command queue 322, the write data 422, or the second write command descriptor 426 to be written to the first command queue 322 transmitted from the first controller 102 to the second controller 104 with direct writes to update the second memory device 110 of FIG. 1 without any intermediate buffer resulting in improved bandwidth and improved latency.

It has also been discovered that a write transaction with information for the first command queue pickup index 314, the first status queue submit index 318, the first write status descriptor 418 to be written to the first status queue 312, or the second write status descriptor 434 to be written to the first status queue 312 transmitted from the second controller 104 to the first controller 102 with direct writes to update the first memory device 108 of FIG. 1 without any intermediate buffer resulting in improved bandwidth and improved latency.

Figure 5:
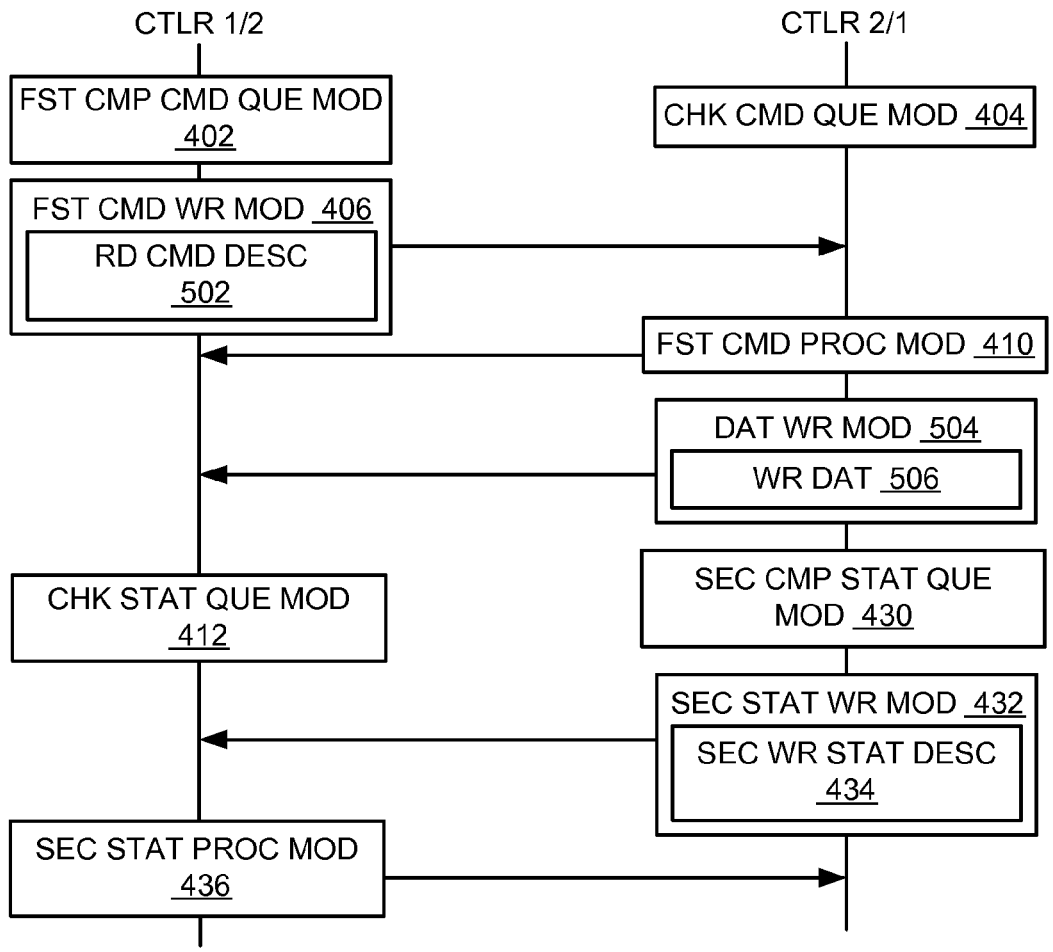
FIG. 5 is a read command functional flow.

Referring now to FIG. 5, therein is shown a read command functional flow. The read command functional flow depicts a read command flow between the first controller 102 of FIG. 1 and the second controller 104 of FIG. 1. The first controller 102 can initiate and perform a read transaction from the second controller 104 to the first controller 102.

The first controller 102 can include the first compare command queue module 402 to compare the first local command queue submit index 316 ($LCCQSI_1$) of FIG. 3 plus one and the first command queue pickup index 314 ($CQPI_1$) of FIG. 3. If the comparison result is the same, the first command queue 322 ($CQ_1$) of FIG. 3 is full and to be retried. Otherwise, a command descriptor can be submitted from the first controller 102 to a remote controller, such as the second controller 104.

The second controller 104 can include the check command queue module 404 to compare the first command queue submit index 324 ($CQSI_1$) of FIG. 3 and the first local command queue pickup index 326 ($LCCQPI_1$) of FIG. 3. If the comparison result is different, there is a command descriptor submitted by a remote controller, such as the first controller 102, for processing. The check command queue module 404 can run or operate in a loop to pick or select any new command descriptor submitted by the remote controller.

The first controller 102 can include the first command write module 406 to generate, and place, store, or update a read command descriptor 502 in a remote command queue, such as the first command queue 322 ($CQ_1$), by writing to a remote memory mapped locally, such as the first remote map 204 of FIG. 2. The read command descriptor 502 can include a command, a size of data to read, and a memory location where data is to be placed or stored. A write transaction with information for the read command descriptor 502 can be transmitted from the first controller 102 to the second controller 104 over the communication path 112 of FIG. 1.

The first command write module 406 updates the first command queue submit index 324 ($CQSI_1$) by writing to a remote memory mapped locally, such as the first remote map 204. The first command write module 406 also updates the first local command queue submit index 316 ($LCCQSI_1$). A write transaction with information for the first command queue submit index 324 ($CQSI_1$) can be transmitted from the first controller 102 to the second controller 104 over the communication path 112.

The second controller 104 can include the first command process module 410 to pick up or read a new command descriptor from the first command queue 322 ($CQ_1$) for processing after the read command descriptor 502 and the first command queue submit index 324 ($CQSI_1$) are received from the first controller 102. The first command process module 410 is executed when the check command queue module 404 detect a new command descriptor, such as the read command descriptor 502, submitted.

The first command process module 410 updates the first command queue pickup index 314 ($CQPI_1$) by writing to a remote memory mapped locally, such as the second remote map 208. A write transaction with information for the first command queue pickup index 314 ($CQPI_1$) can be transmitted from the second controller 104 to the first controller 102 over the communication path 112.

The first command process module 410 also updates the first local command queue pickup index 326 ($LCCQPI_1$). A command in the read command descriptor 502 is then processed and a data buffer is allocated by the first command process module 410.

The second controller 104 can include a data write module 504 to generate, and place or store write data 506 directly into a requested remote's memory location by writing to a remote memory mapped locally, such as the second remote map 208 of FIG. 2, if there is no error in processing the command. A write transaction with information for the write data 506 can be sent or transmitted from the second controller 104 to the first controller 102 over the communication path 112.

The data write module 504 can be similar to or the same as the write data module 421 of FIG. 4. For example, the data write module 504 can include the same functionality as that of the write data module 421.

The first controller 102 can include the check status queue module 412 to compare the first status queue submit index 318 ($SQSI_1$) of FIG. 3 and the first local status queue pickup index 320 ($LCSQPI_1$) of FIG. 3. If the comparison result is different, there is a status descriptor submitted by a remote controller, such as the second controller 104, for processing. This module can run or operate in a loop to pick or select any new status descriptor submitted by the remote controller.

The second controller 104 can include the second compare status queue module 430 to compare the first local status queue submit index 330 ($LCSQSI_1$) of FIG. 3 plus one and the first status queue pickup index 328 ($SQPI_1$) of FIG. 3. If the comparison result is the same, the first status queue 312 ($SQ_1$) of FIG. 3 is full and to be retried. Otherwise, a status descriptor can be submitted from the second controller 104 to a remote controller, such as the first controller 102.

The second controller 104 can include the second status write module 432 to generate, and place or store the second write status descriptor 434 in a remote status queue, such as the first status queue 312 ($SQ_1$), by writing to a remote memory mapped locally, such as the second remote map 208. The second write status descriptor 434 can include the status of the command. A write transaction with information for the second write status descriptor 434 can be sent or transmitted from the second controller 104 to the first controller 102 over the communication path 112.

The second status write module 432 updates the first status queue submit index 318 ($SQSI_1$) by writing to a remote memory mapped locally, such as the second remote map 208. The second status write module 432 also updates the first local status queue submit index 330 ($LCSQSI_1$). A write transaction with information for the first status queue submit index 318 ($SQSI_1$) can be sent or transmitted from the second controller 104 to the first controller 102 over the communication path 112.

The first controller 102 can include the second status process module 436 to pick up or read a new status descriptor, such as the second write status descriptor 434, from the first status queue 312 ($SQ_1$) for processing after the second write status descriptor 434 and the first status queue submit index 318 ($SQSI_1$) are received from the second controller 104. The second status process module 436 is executed when the check status queue module 412 detects a new status descriptor, such as the second write status descriptor 434, is submitted.

The second status process module 436 updates the first status queue pickup index 328 ($SQPI_1$) by writing to a remote memory mapped locally, such as the first remote map 204. A write transaction with information for the first status queue pickup index 328 ($SQPI_1$) can be transmitted from the first controller 102 to the second controller 104 over the communication path 112.

The second status process module 436 also updates the first local status queue pickup index 320 ($LCSQPI_1$). The status in the descriptor, such as the second write status descriptor 434, and the data are then processed by the second status process module 436. This completes the read command functional flow.

For illustrative purposes, the first controller 102 and the second controller 104 are depicted having modules described above, although it is understood that each of the first controller 102 and the second controller 104 can include the same modules. For example, each of the first controller 102 and the second controller 104 can include all of the previously described modules in both of the first controller 102 and the second controller 104.

It has been discovered that a write transaction with information for the first command queue submit index 324, the first status queue pickup index 328, or the read command descriptor 502 to be written to the first command queue 322 transmitted from the first controller 102 to the second controller 104 with direct writes to update the second memory device 110 of FIG. 1 without any intermediate buffer resulting in improved bandwidth and improved latency.

It has also been discovered that a write transaction with information for the first command queue pickup index 314, the first status queue submit index 318, the second write status descriptor 434 to be written to the first status queue 312, or the write data 506 transmitted from the second controller 104 to the first controller 102 with direct writes to update the first memory device 108 of FIG. 1 without any intermediate buffer resulting in improved bandwidth and improved latency.

Figure 6:
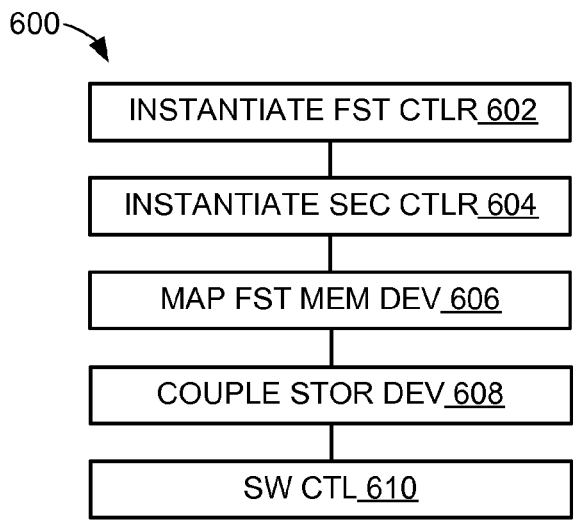
FIG. 6 is a flow chart of a method of operation of the redundant array of independent disks system in a further embodiment of the present invention.

Referring now to FIG. 6, therein is shown a flow chart of a method 600 of operation of the redundant array of independent disks system 100 in a further embodiment of the present invention. The method 600 includes: instantiating a first controller having a first local map and a first remote map in a block 602; instantiating a second controller having a second local map and a second remote map mapped to the first local map in a block 604; mapping a first memory device to the first local map by the first controller in a block 606; coupling a storage device to the second controller and the first controller in a block 608; and switching control of the storage device to the first controller, when a failure of the second controller is detected, by the first controller reading the first memory device in a block 610.

Thus, it has been discovered that the redundant array of independent disks system of the present invention furnishes important and heretofore unknown and unavailable solutions, capabilities, and functional aspects for a redundant array of independent disks system with inter-controller communication. The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a redundant array of independent disks system comprising:
    instantiating a first controller having a first local map and a first remote map;
    instantiating a second controller having a second local map and a second remote map mapped to the first local map;
    mapping a first memory device to the first local map by the first controller;
    coupling a storage device to the second controller and the first controller;
    writing to the second remote map of the second controller for performing a direct remote write to the first local map of the first controller;
    initiating a read transaction from the second controller to the first controller, the read transaction is achieved using a write only scheme including:
        sending a read command descriptor from the second controller to the first controller in a controller-to-controller communication protocol, and
        performing the direct remote write of the second remote map by the first controller based on the read command descriptor for avoiding a PCI-express read transaction; and
    switching control of the storage device to the first controller, when a failure of the second controller is detected, by the first controller reading the first memory device.

2. The method as claimed in claim 1 further comprising writing to the first remote map for updating the second local map.

3. The method as claimed in claim 1 further comprising:
    generating a write command descriptor by the first controller; and
    updating a second memory device with the write command descriptor, the second memory device mapped to the second local map by the second controller.

4. The method as claimed in claim 1 further comprising:
    generating the read command descriptor by the first controller; and
    updating a second memory device with the read command descriptor, the second memory device mapped to the second local map by the second controller.

5. The method as claimed in claim 1 further comprising:
    generating a write status descriptor by the second controller; and
    updating the first memory device with the write status descriptor.

6. A method of operation of a redundant array of independent disks system comprising:
    instantiating a first controller having a first local map and a first remote map;
    instantiating a second controller having a second local map and a second remote map mapped to the first local map;
    mapping a first memory device to the first local map by the first controller;
    mapping a second memory device to the second local map by the second controller;
    coupling a storage device to the second controller and the first controller;
    writing to the second remote map of the second controller for performing a direct remote write to the first local map of the first controller;
    initiating a read transaction from the second controller to the first controller, the read transaction is achieved using a write only scheme including:
        sending a read command descriptor from the second controller to the first controller in a controller-to-controller communication protocol, and
        performing the direct remote write of the second remote map by the first controller based on the read command descriptor for avoiding a PCI-express read transaction, and
    switching control of the storage device to the first controller, when a failure of the second controller is detected, by the first controller reading the first memory device.

7. The method as claimed in claim 6 further comprising writing to the first remote map including sending a write transaction for updating the second local map.

8. The method as claimed in claim 6 further comprising:
    generating a write command descriptor by the first controller; and
    updating a first command queue in the second memory device with the write command descriptor.

9. The method as claimed in claim 6 further comprising:
    generating the read command descriptor by the first controller; and
    updating a first command queue in the second memory device with the read command descriptor.

10. The method as claimed in claim 6 further comprising:
    generating a write status descriptor by the second controller; and
    updating a first status queue in the first memory device with the write status descriptor.

11. A redundant array of independent disks system comprising:
    a first controller having a first local map and a first remote map, the first controller for performing a direct remote write to a second remote map;
    a second controller having a second local map and the second remote map mapped to the first local map, the second controller for writing to the second remote map for performing the direct remote write to the first local map of the first controller and for initiating a read transaction from the second controller to the first controller, the read transaction is achieved using a write only scheme, and the read transaction is for sending a read command descriptor from the second controller to the first controller for performing the direct remote write;
    a first memory device mapped to the first local map by the first controller; and
    a storage device coupled to the second controller and the first controller, the storage device controlled by the second controller with control of the storage device switched to the first controller, when a failure of the second controller is detected, by the first controller reading the first memory device.

12. The system as claimed in claim 11 wherein the first controller is for writing to the first remote map for updating the second local map.

13. The system as claimed in claim 11 wherein:
    the first controller includes a first command write module for generating a write command descriptor; and
    further comprising:
    a second memory device updated with the write command descriptor, the second memory device mapped to the second local map by the second controller.

14. The system as claimed in claim 11 wherein:
    the first controller includes a first command write module for generating the read command descriptor; and further comprising:
a second memory device updated with the read command descriptor, the second memory device mapped to the second local map by the second controller.

15. The system as claimed in claim 11 wherein:
the second controller includes a first status write module for generating a write status descriptor; and
the first memory device is updated with the write status descriptor.

16. The system as claimed in claim 11 further comprising a second memory device mapped to the second local map by the second controller.

17. The system as claimed in claim 16 wherein the first controller is for writing to the first remote map including sending a write transaction for updating the second local map.

18. The system as claimed in claim 16 wherein:
the first controller includes a first command write module for generating a write command descriptor; and
the second memory device having a first command queue updated with the write command descriptor.

19. The system as claimed in claim 16 wherein:
the first controller includes a first command write module for generating the read command descriptor; and
the second memory device having a first command queue updated with the read command descriptor.

20. The system as claimed in claim 16 wherein:
the second controller includes a first status write module for generating a write status descriptor; and
the first memory device having a first status queue updated with the write status descriptor.

* * * * *